(12) United States Patent
Jones, IV et al.

(10) Patent No.: US 6,562,119 B2
(45) Date of Patent: May 13, 2003

(54) USE OF MICROWAVE-PRODUCED CARBON BLACK TO IMPROVE WEATHERING OF BITUMINOUS COATING

(75) Inventors: David R. Jones, IV, Tampa, FL (US); David C. Trumbore, LaGrange, IL (US)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 140 days.

(21) Appl. No.: 09/872,433

(22) Filed: May 30, 2001

(65) Prior Publication Data

US 2002/0189494 A1 Dec. 19, 2002

(51) Int. Cl.$^7$ .............................................. C09D 195/00
(52) U.S. Cl. .................................... 106/284.05; 52/518
(58) Field of Search ........................ 106/284.05; 52/518

(56) References Cited

U.S. PATENT DOCUMENTS

| 4,647,443 A | 3/1987 | Apffel |
| 5,364,821 A | 11/1994 | Holland |
| 6,152,306 A | 11/2000 | Miller |

FOREIGN PATENT DOCUMENTS

| JP | 2000034114 | 2/2000 |

OTHER PUBLICATIONS

Molecular waste technologies, Take out the trash, and put it where? No Date Provided.
Molecular waste technologies, Advantage, No Date Provided.
Molecular waste technologies, Micarb sample, Carbon black, No Date Provided.
http://www.molecularwastetech.com/, Microwave processor of waste recycling for a clean environment, May 15, 2001.
http://www.wisecompanies.ws/mwt/, Molecular waste technologies, Inc. stock offering, No Date Provided.
http://wise–exchange.ws/latest news/, A clean process for recycling tires, Jun. 19, 2000.

*Primary Examiner*—David Brunsman
(74) *Attorney, Agent, or Firm*—Inger H. Eckert; James J. Dottavio

(57) ABSTRACT

In a method of improving the weathering of a bituminous coating, a microwave-produced carbon black is added to the coating. The microwave-produced carbon black is added in an amount sufficient to increase the cycles-to-failure of the coating by at least about 10% compared to the same coating without the added microwave-produced carbon black, when tested for weathering according to ASTM D 4799-00.

25 Claims, No Drawings

USE OF MICROWAVE-PRODUCED CARBON BLACK TO IMPROVE WEATHERING OF BITUMINOUS COATING

TECHNICAL FIELD AND INDUSTRIAL APPLICABILITY OF THE INVENTION

The present invention is related generally to bituminous coating materials, and more particularly to a method of improving the weathering of a bituminous coating material.

BACKGROUND OF THE INVENTION

Bituminous coating materials are used in many different outdoor applications to provide protection from the weather. For example, asphalt-based coating materials are used in roofing products such as roofing shingles, built-up roofing and roll roofing to protect the underlying building from rain and sunlight. Over an extended period of time, exposure of the coating material to the weather may cause deterioration of the coating material, such as brittleness and cracking. Therefore, it would be desirable to provide a method of improving the weathering of bituminous coating materials.

Carbon black obtained from conventional combustion processes has been used in plastics for resistance to UV radiation. It has also been added to roofing and paving asphalts to increase the stiffness of the asphalt, most probably through filler-filler interactions of the carbon black particles. However, in such prior uses in roofing and paving asphalts, addition of conventional carbon black to asphalt-based coating materials has been shown not to improve the weathering of the coating materials.

Several patents describe carbon black produced by microwave heating, but there is no suggestion in the patents to use the carbon black to improve the weathering of bituminous coating materials. For example, U.S. Pat. No. 6,152,306 to Miller discloses a process in which solid waste is reduced to carbon black and oil by heating the waste with microwave energy and externally applied heat. The carbon black is used for energy purposes or as feedstock. U.S. Pat. No. 4,647,443 to Apffel discloses a process for recovering carbon black from used vehicle tires, including a conventional pyrolysis step followed by a microwave heating step. The carbon black is used as a feed stock to make new tires. U.S. Pat. No. 5,364,821 to Holland discloses a method of producing active carbon by microwave heating a carbonaceous material. The active carbon is used for filtration of liquids.

SUMMARY OF THE INVENTION

The above object as well as others not specifically enumerated are achieved by a method of improving the weathering of a bituminous coating according to the invention. The method comprises adding to the bituminous coating a microwave-produced carbon black in an amount sufficient to increase the cycles-to-failure of the coating by at least about 10% compared to the same coating without the added microwave-produced carbon black, when tested for weathering according to ASTM D 4799-00.

In another embodiment of the invention, the method comprises adding to the bituminous coating a microwave-produced carbon black in an amount sufficient to increase the cycles-to-failure of the coating by at least about 10% compared to the same coating containing a conventional carbon black (Industry Reference Black 7) in place of the microwave-produced carbon black.

The invention also relates to a bituminous coating material with improved weathering properties. The coating contains a bituminous coating material and a microwave-produced carbon black added in an amount sufficient to increase the cycles-to-failure of the coating by at least about 10% compared to the same coating without the added microwave-produced carbon black, when tested for weathering according to ASTM D 4799-00.

Various objects and advantages of this invention will become apparent to those skilled in the art from the following detailed description of the preferred embodiments.

DETAILED DESCRIPTION AND PREFERRED EMBODIMENTS OF THE INVENTION

Conventional carbon black has been tested numerous times to determine if its addition improves the weathering of asphalt-based coating materials, and uniformly it has not shown an improvement in weathering when testing the coating material using the Weatherometer test (ASTM Test Method D 4799-00). However, unlike conventional carbon black, it has been discovered that the addition of even a small amount of microwave-produced carbon black to a bituminous coating material substantially improves its weathering under this test.

In the method of the present invention, microwave-produced carbon black is added to a bituminous coating material in an amount sufficient to increase the cycles-to-failure of the coating material by at least about 10% compared to the same coating material without the added microwave-produced carbon black, and preferably at least about 15%. The cycles-to-failure of the coating material is measured by testing it for weathering according to ASTM D 4799-00, "Standard Test Method for Accelerated Weathering Test Conditions and Procedures for Bituminous Materials (Fluorescent UV and Condensation Method)", published March 2000. Using Cycle A of the test method, the coating material is exposed to cycles of four hours of UV light at 60° C., alternating with fours hours of condensation at 50° C. The cycles are continued until the coating material fails due to cracking as determined by ASTM Test Method D 1670.

In a related embodiment of the invention, microwave-produced carbon black is added to a bituminous coating material in an amount sufficient to increase the cycles-to-failure of the coating material by at least about 10% compared to the same coating material containing a conventional carbon black in place of the microwave-produced carbon black, and preferably at least about 15%. For purposes of comparison, the conventional carbon black is defined as an Industry Reference Black 7, which is a standard reference carbon black that can be used to achieve good agreement with standard ASTM test comparisons. The Industry Reference Black 7 is commercially available from Laboratory Standards and Technologies, LLC, 227 Somerset Street, Borger, Tex. 79007.

The addition of the microwave-produced carbon black improves the weathering of the bituminous coating material even at low addition levels where particle-particle interactions of the carbon black particles provide no stiffening or other mechanical benefits to the coating material. For example, the microwave-produced carbon black improves the weathering when added in an amount within a range between about 0.5% and about 10% by weight, preferably within a range between about 0.5% and about 8% by weight, and more preferably within a range between about 1% and about 5% by weight. The addition of the microwave-produced carbon black at a level of about 2% by weight has improved the weathering of the coating material by about 15%. Amounts of microwave-produced carbon black greater than about 10% could also be used. The given weight percentages are by total weight of the bituminous coating material, excluding any filler in the coating material.

The microwave-produced carbon black is carbon black that is produced at least primarily by the application of microwave energy (greater than 50% microwave energy), although other forms of heat energy can also be applied. Preferably, the carbon black is produced substantially solely by the application of microwave energy. The microwave-produced carbon black is usually produced by applying microwave energy to an organic material in a reducing atmosphere to break down the organic material and produce carbon black and oil. The reducing atmosphere is an oxygen-poor atmosphere in which the organic material is broken down by heat alone, with substantially no oxidation (burning). Preferably, the mass temperature of the organic material remains below about 700° F. (371° C.) during the process of applying the microwave energy.

Substantially any type of organic material can be used as the raw material. Preferably, the organic material is selected from municipal solid waste, waste tires, carpet waste, fluff organics from vehicle recycling, and mixtures thereof. Most preferably the organic material is waste tires.

A preferred microwave-produced carbon black for use in the invention is commercially available as "MICARB", which is manufactured by Molecular Waste Technologies, Inc., 531 Salem Woods Dr., Marietta, Ga. 30067. In the process for producing MICARB, the raw materials are received and any non-organic materials are sorted out. The organic materials are fed through microwave processing units, where the materials are exposed to microwave energy. The microwave energy breaks the weakest carbon bonds of the organic material first, and thereby releases bonding energy. The released energy adds heat to the material and helps raise the temperature of the material. The resulting expansion helps strain the carbon bonds, and combined with the interaction with the microwaves breaks more bonds until the organic material is reduced to carbon black and oil. The reaction occurs at a temperature between about 300°–350° C. (572°–662° F.). U.S. Pat. No. 6,152,306 assigned to Molecular Waste Technologies (incorporated by reference herein) discloses details about equipment and processing conditions that can be used in a microwave process for reducing solid waste into carbon black and oil.

In addition to the microwave-produced carbon black, the bituminous coating material contains a substantial portion of a bituminous material, such as an asphalt, tar or pitch. The asphalt can be either a naturally occurring asphalt or a manufactured asphalt, such as an asphalt produced by refining petroleum or by other known means. Mixtures of different asphalts can also be used. The bituminous coating material can also contain other materials, such as polymers, waxes, fillers, stabilizers, antioxidants, pigments, and/or solvents.

The bituminous coating material is typically prepared by combining the components and mixing them together with heating. With some compositions, high shear mixing is used to provide a homogeneous coating material.

The bituminous coating material having improved weathering can be used in any application where the coating material is exposed to the weather. For example, the coating material can be used to make asphalt-based roofing products such as shingles, built-up roofing and roll roofing. The coating material can also be used in other construction-related applications, such as coating the exterior of buildings to provide weatherproofing. The use of microwave-produced carbon black to improve weathering could also be used with other bituminous products such as roofing cements, waterproofing coatings, pipe coatings, bituminous paints, asphalt paving materials, and the like.

EXAMPLE 1

Five different asphalt compositions were prepared as shown below. The first three compositions contained 2% by weight of microwave-produced carbon black (MICARB, Molecular Waste Technologies, Inc) in addition to the asphalt. The fourth and fifth compositions contained 100% asphalt. The compositions were tested for weathering according to ASTM D 4799-00. The compositions with the added microwave-produced carbon black had significantly increased cycles-to-failure compared to the compositions without the carbon black, which indicates their improved weathering.

| Composition | Cycles-to-Failure |
| --- | --- |
| 98% Asphalt (Shell 92), 2% MICARB | 68.3 |
| 98% Asphalt (Shell 92), 2% MICARB | 71.6 |
| 98% Asphalt (Shell 92), 2% MICARB | 87.3 |
| 100% Asphalt (Shell 92) | 54.5 |
| 100% Asphalt (Shell 92) | 46.0 |

EXAMPLE 2 (HYPOTHETICAL)

An asphalt-based coating for roofing shingles could be made by combining a ground limestone filler with an asphalt-based composition containing 98% asphalt and 2% microwave-produced carbon black. The filler could be added in any conventional amount, such as in a ratio of about 60% filler and about 40% asphalt/carbon black. The coating could be applied to a nonwoven glass fiber mat in a known manner, and roofing granules could be applied to the top surface of the coated mat. The coated mat could be cut into roofing shingles. The roofing shingles would have significantly improved weathering (at least about 10% improvement) compared to shingles without the added microwave-produced carbon black. The amount of carbon black could be varied; for example, 5% or 8% carbon black could be used instead of 2%.

EXAMPLE 3 (HYPOTHETICAL)

A polymer-modified asphalt coating having improved weathering could be prepared by combining 89% asphalt, 9% SBS polymer, and 2% microwave-produced carbon black. The polymer-modified asphalt coating could be used, for example, to coat the interior of corrugated pipes.

EXAMPLE 4 (HYPOTHETICAL)

A modified asphalt coating having improved weathering could be prepared by combining 94% asphalt, 4% bis-stearoylamide, and 2% microwave-produced carbon black. The coating could be used, for example, as a roofing asphalt on sloped roofs, having an improved ability to stay where applied on the roof.

The principle and mode of operation of this invention have been described in its preferred embodiments. However, it should be noted that this invention may be practiced otherwise than as specifically illustrated and described without departing from its scope. For example, although the MICARB product manufactured by Molecular Waste Technologies is a preferred microwave-produced carbon black, it is recognized that other types of microwave-produced carbon black can also be used. The bituminous coating material having improved weathering can be used in many other applications in addition to those specifically mentioned.

What is claimed is:

1. A method of improving the weathering of a bituminous coating, comprising adding to the bituminous coating a microwave-produced carbon black in an amount sufficient to increase the cycles-to-failure of the coating by at least about 10% compared to the same coating without the added microwave-produced carbon black, when tested for weathering according to ASTM D 4799-00.

2. A method according to claim 1 wherein the cycles-to-failure of the coating is increased by at least about 15% compared to the same coating without the added microwave-produced carbon black.

3. A method according to claim 1 wherein the microwave-produced carbon black is added in an amount within a range between about 0.5% and about 10% by total weight of the bituminous coating, excluding any filler added.

4. A method according to claim 1 wherein the microwave-produced carbon black is added in an amount within a range between about 0.5% and about 8% by total weight of the bituminous coating, excluding any filler added.

5. A method according to claim 1 wherein the microwave-produced carbon black is added in an amount that does not increase the viscosity of the bituminous coating, compared to the same coating without the added microwave-produced carbon black.

6. A method according to claim 1 wherein the microwave-produced carbon black is produced by applying microwave energy to an organic material in a reducing atmosphere to break down the organic material and produce carbon black, and wherein the mass temperature of the organic material remains below about 700° F. (371° C.) during the process of applying the microwave energy.

7. A method according to claim 6 wherein the organic material is selected from the group consisting of municipal solid waste, waste tires, carpet waste, and fluff organics from vehicle recycling, and mixtures thereof.

8. A method according to claim 1 wherein the bituminous coating is a coating on a roofing product.

9. A method according to claim 1 wherein the bituminous coating is a coating on a roofing product, and the microwave-produced carbon black is added in an amount within a range between about 0.5% and about 10% by total weight of the bituminous coating, excluding any filler added.

10. A method according to claim 9 wherein the cycles-to-failure of the coating is increased by at least about 15% compared to the same coating without the added microwave-produced carbon black.

11. A method of improving the weathering of a bituminous coating, comprising adding to the bituminous coating a microwave-produced carbon black in an amount sufficient to increase the cycles-to-failure of the coating by at least about 10% compared to the same coating containing Industry Reference Black 7 in place of the microwave-produced carbon black, when tested for weathering according to ASTM D 4799-00.

12. A method according to claim 11 wherein the cycles-to-failure of the coating is increased by at least about 15% compared to the same coating containing Industry Reference Black 7.

13. A method according to claim 11 wherein the microwave-produced carbon black is added in an amount within a range between about 0.5% and about 10% by total weight of the bituminous coating, excluding any filler added.

14. A method according to claim 11 wherein the microwave-produced carbon black is added in an amount within a range between about 0.5% and about 8% by total weight of the bituminous coating, excluding any filler added.

15. A method according to claim 11 wherein the microwave-produced carbon black is produced by applying microwave energy to an organic material in a reducing atmosphere to break down the organic material and produce carbon black.

16. A method according to claim 15 wherein the mass temperature of the organic material remains below about 700° F. (371° C.) during the process of applying the microwave energy.

17. A method according to claim 11 wherein the bituminous coating is a coating on a roofing product.

18. A bituminous coating material with improved weathering properties, comprising:

a bituminous coating material; and a microwave-produced carbon black added to the bituminous coating material in an amount sufficient to increase the cycles-to-failure of the coating by at least about 10% compared to the same coating without the added microwave-produced carbon black, when tested for weathering according to ASTM D 4799-00.

19. A roof coating material, said material including the bituminous coating material according to claim 18.

20. A roofing shingle manufactured using the bituminous coating material of claim 18.

21. A method of improving the weathering of a bituminous product, comprising adding to the bituminous product a microwave-produced carbon black in an amount sufficient to increase the cycles-to-failure of the product by at least about 10% compared to the same product without the added microwave-produced carbon black, when tested for weathering according to ASTM D 4799-00.

22. A method according to claim 21 wherein the cycles-to-failure of the product is increased by at least about 15% compared to the same product without the added microwave-produced carbon black.

23. A method according to claim 21 wherein the microwave-produced carbon black is added in an amount within a range between about 0.5% and about 10% by total weight of the bituminous product, excluding any filler added.

24. A method according to claim 21 wherein the microwave-produced carbon black is added in an amount within a range between about 0.5% and about 8% by total weight of the bituminous product, excluding any filler added.

25. A method according to claim 21 wherein the microwave-produced carbon black is produced by applying microwave energy to an organic material in a reducing atmosphere to break down the organic material and produce carbon black, and wherein the mass temperature of the organic material remains below about 700° F. (371° C.) during the process of applying the microwave energy.

* * * * *